April 30, 1963  M. A. SELIGER  3,087,280
FLOWER ARRANGING HOLDER
Filed Dec. 30, 1960

INVENTOR.
MILDRED A. SELIGER
BY Eugene M. Eckelman
ATTORNEY

United States Patent Office 3,087,280
Patented Apr. 30, 1963

3,087,280
FLOWER ARRANGING HOLDER
Mildred A. Seliger, 303 SE. 172nd Ave.,
Portland 33, Oreg.
Filed Dec. 30, 1960, Ser. No. 79,906
1 Claim. (Cl. 47—41)

This invention relates to a flower holder and more particularly is concerned with a holder for use in accomplishing flower arrangements.

A primary object of the present invention is to provide a flower arranging holder employing novel flower stem engaging members and more particularly flower stem engaging members which have individual adjustable movement for selectively positioning the flowers in the formation of an arrangement.

Another object is to provide a flower arranging holder employing flower stem engaging members which are adapted to be positioned at desired angular relation while supporting a flower stem, whereby the arrangement can be formed after the flowers are supported in the holder.

A further object is to provide a novel combination of flower stem engaging members and supporting base therefor, whereby said flower stem engaging members project into and are molded as an integral part of the base.

Still another object of the present invention is to provide a flower arranging holder which is attractive in appearance and which may be formed by conventional and simplified manufacturing mechanisms and processes.

Briefly stated, the present flower arranging holder comprises a base having a molded connection with an upright stem from which a plurality of flower engaging members project. The latter members assume a spiral coil shape with the inside diameter of the coil being of a size to receive freely the flower stems. The coils have terminal end or shank portions which are suitably bent and wrapped together to form the upright stem, the material from which the flower engaging members are formed being bendable for ready formation of the coils and for bending the coils as a whole to any selected position in the shaping of a flower arrangement.

The invention will be better understood and additional objects and advantages will become apparent from the following description taken in connection with the accompanying drawings which illustrate preferred forms of the device. It is to be understood, however, that the invention may take still other forms and all such modifications and variations within the scope of the appended claim which will occur to persons skilled in the art are included in the invention.

Figure 1:
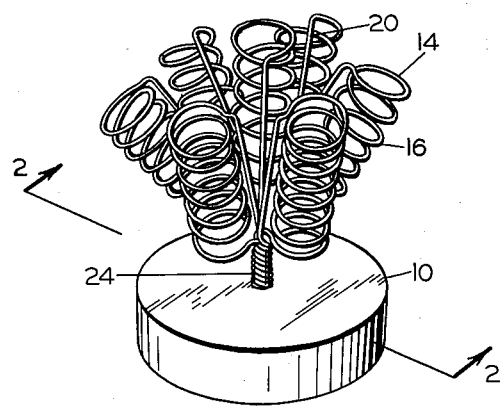
FIGURE 1 is a perspective view of the present flower arranging holder.
Figure 2:
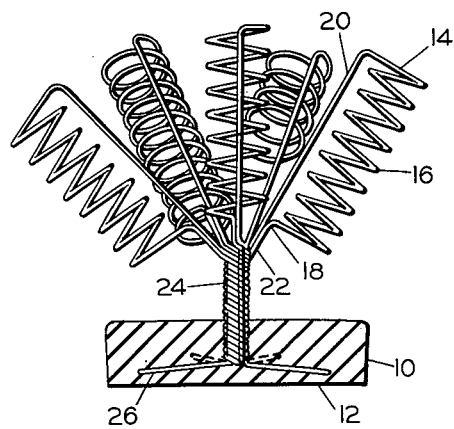
FIGURE 2 is a sectional view of the holder taken on the line 2—2 of FIGURE 1.

Referring now in particular to the drawings, the present holder comprises a base 10 which in a preferred construction may be molded of heavy material such as a lead alloy. This base member has a flat bottom surface 12 for supporting it in an upright position on any desired surface such as a shelf, in the formation of dry flower arrangements or in a vase or the like for watered arrangements. The base 10 preferably has sufficient lateral dimension and weight to hold a floral arrangement in an upright position.

The present device has flower stem engaging portions 14 comprising socket members in the form of spiral coils 16. The flower stem engaging portions 14 are preferably formed from wire stock of a suitable alloy which has sufficient rigidity to support the flowers in upright position but yet is capable of being bent for ready formation of the coils and for bending to any desired angular disposition relative to the base, as will be more apparent hereinafter.

In the construction of the individual flower stem engaging members 14 a coil 16 is provided intermediate to the ends of a length of wire of the type described to form end portions or extensions 18 and 20. These two end portions are provided with right angle bends and thus extend parallel to the coil. There is thus formed a first extension, comprising end 18, extending downwardly from the lower portion of the coil and a second extension, comprising end 20, extending down along the side of the coil in adjacent parallel relation with the extension 18, thus forming a double structure shank 22.

The shanks 22 are connected together, preferably by wrapping them as shown, to form a single stem or standard 24. The stem 24 preferably has a molded connection with the base 10, such connection being accomplished readily by positioning the lower end of the said stem in the mold area when forming the base and permitting the material of the base to harden.

To establish a rigid and positive connection between the stem 24 and the base 10 the lower ends of the shanks 22 of the stem engaging members 14 are left unwrapped and are bent outwardly at right angles to the stem 24 to form lateral fingers 26, such arrangement providing an increased connection area between the stem and the base. In addition to providing such maximum connection between the support members the structure thus described also assists in maintaining the stem 24 in upright position. It is also apparent that the wrapped structure of the stem 24 provides exterior spiral grooves which of course are filled by the mold material of the base around the stem and thus further anchors the latter to the base.

For the purpose of forming an arrangement the device may be seated on a shelf for the formation of a dry flower arrangement or be placed interiorly of a vase or the like for the formation of a watered arrangement. The flower stems are inserted in the coils and supported in the desired inclination by bending the coils to selected positions. The latter may be arranged in their desired inclination prior to insertion of the flower stems but it is a feature of this invention that such adjustment may, if desired, also be accomplished after the flowers are in place.

It will be evident that in positioning the coils 16 to selected positions the bend will occur in the shank portions 22. Since these elements are formed of a relatively soft bendable metal they may be positioned repeatedly without breaking. Although as stated the bend will occur in the shank portions 22, it is apparent that since the coils are formed of the same material they also may be bent if such is desired better to engage or position the flower stems.

In accordance with the present invention there is thus provided a flower arranging holder which is self supporting and which provides for convenient and rapid formation of arrangements merely by inserting the flower stems into the coils, which as stated hereinbefore may be bent to the desired angle prior to or after reception of the flower stems. The device may be formed with any number or size of coils 16 depending upon the use intended therefor.

Having now described my invention and in what manner the same may be used, what I claim as new and desire to protect by Letters Patent is:

A flower arranging holder comprising a molded base, and a plurality of flower holding members, each of said flower holding members comprising a length of wire having a spiral coil therein for receiving the flowers and having extensions leading from the ends of the coil, the extension from one end of the coil having a portion parallel to the coil and the extension from the other end of the coil having a portion in close proximity to a portion of the first said extension which is a continuation of said parallel portion to form a double supporting shank for the spiral coil, all of said shanks being wound together to form a common support, said support having its lower portion molded as a part of said base for integral connection thereto.

References Cited in the file of this patent

UNITED STATES PATENTS

| | | |
|---|---|---|
| D. 97,712 | Orben | Dec. 3, 1935 |
| D. 188,384 | Messer | July 12, 1960 |
| 2,011,990 | Aldridge | Aug. 20, 1935 |
| 2,151,192 | Crosser | Mar. 21, 1939 |

FOREIGN PATENTS

| | | |
|---|---|---|
| 1,133,175 | France | Nov. 12, 1956 |